Sept. 8, 1925.  
C. G. BARR  
CRANK SHAFT  
Filed Nov. 5, 1924
1,552,667
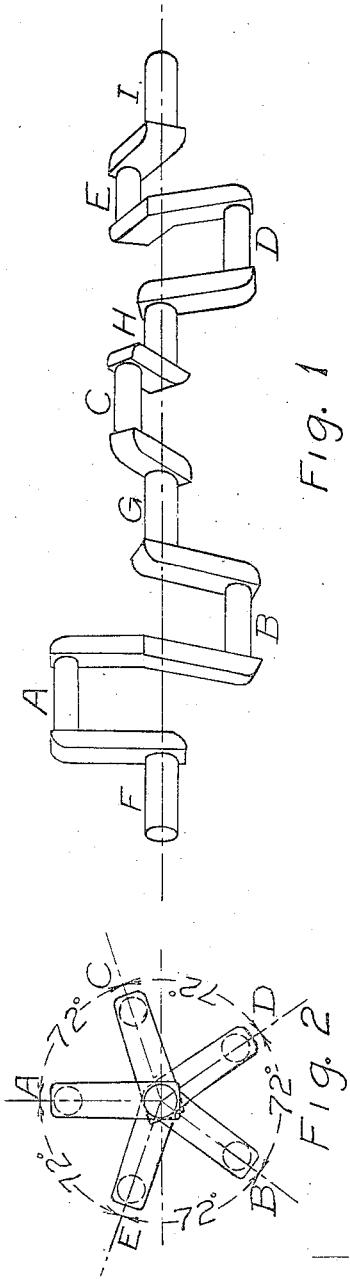
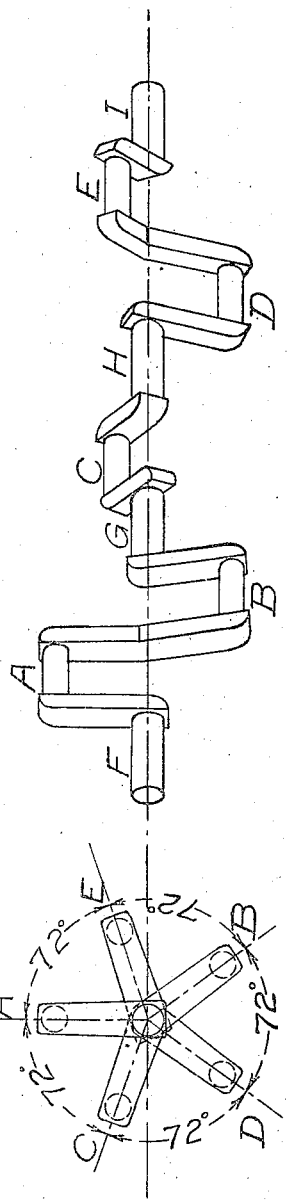
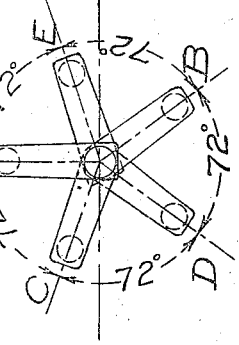
Chris G. Barr INVENTOR.

Patented Sept. 8, 1925.

1,552,667

UNITED STATES PATENT OFFICE.

CHRIS G. BARR, OF EL CENTRO, CALIFORNIA.

CRANK SHAFT.

Application filed November 5, 1924. Serial No. 748,263.

*To all whom it may concern:*

Be it known that I, CHRIS G. BARR, a citizen of the United States, residing at El Centro, in the county of Imperial and the State of California, have invented a new and useful Crank Shaft, of which the following is a specification.

My invention relates to an improvement of a crank shaft having five cranks and which is particularly suited to the five cylinder straight type or the ten cylinder V type of internal combustion engines. The object of my improvement is to provide a self-balancing crank shaft, that is, a crank shaft requiring no counter weights to effect a balance, by means of the arrangement of the angular distance of the various cranks with respect to each other and the order of explosions in the various cylinders.

I attain these objects by the mechanism illustrated in the accompanying drawing, in which—

Fig. 1 is a perspective view of the crank shaft, Fig. 2 is an end view showing the angular arrangement of the crank bearings of the crank shaft shown in Fig. 1, Fig. 3 is a perspective view of a crank shaft similar to that shown in Fig. 1 except that the angular arrangement of the cranks are in the reverse order, and Fig. 4 is an end view showing the angular arrangement of the crank bearings of the crank shaft shown in Fig. 3.

Similar letters refer to similar parts throughout the several views.

A, B, C, D, and E show the five respective cranks in the order from left to right. F, G, H, and I are main bearings which support the shaft.

Before proceeding with a more detailed description of my invention, it must be clearly understood that although the crank shaft herein described and illustrated is mainly intended for use in connection with internal combustion engines, the same can be as efficiently used with pumps, steam engines, or other machinery utilizing crank shafts.

Assuming that the crank shaft shown in Fig. 1 rotates in a clockwise direction when facing the left end of the crankshaft and noting that the order of explosion must be opposite to the direction of rotation, then by referring to Fig. 2 it is seen that the explosions would come in the following order, A, B, C, E, and D. It will also be seen that the angular distance between each of the crank bearings in the order just named is 144 degrees, and further, that in a clockwise direction, A is 216 degrees from B, and B is 216 degrees from C, and C is 72 degrees from D, and D is 144 degrees from E, and from E to A is 72 degrees.

Assuming that the crank shaft shown in Fig. 1 rotates in a counter clockwise direction when facing the left end of the shaft and remembering that the order of explosion is opposite to the direction of rotation, it is seen, by referring to Fig. 2, that the explosions would come in the order of A, D, E, C, and B, that the angular distance between the crank bearings in the order just named is 144 degrees, while the clockwise angular distance between A and B, B and C, etc. is the same as before.

I prefer, for motors or crank shafts rotating counter clockwise, to use the crank shaft as designed in Fig. 3 in which the order of the angular distance between the crank bearings is reversed and, therefore, the order of explosions would be similar to that of a motor and crank shaft rotating clock-wise and using the crank shaft shown in Fig. 1, viz, A, B, C, E, and D. See Fig. 4. This latter order gives a better distribution of explosions along the shaft. The angular distance between the crank bearings in the order just named is 144 degrees. However, the angular distance in a clock-wise direction between A and B is 144 degrees, between B and C is 144 degrees, between C and D is 288 degrees, D and E is 216 degrees, and from E to A is 288 degrees. See Fig. 4.

If the crank shaft shown in Fig. 3 is assumed to rotate clock-wise then the order of explosions would be in the reverse order, viz, A, D, E, C, and B, and similar in order to that of a motor using the crank shaft shown in Fig. 1 and rotating counter clockwise. The angular distance between the crank bearings in the order just named is 144 degrees, while the clock-wise angular distance between A and B, B and C, etc., is the same as in the preceding paragraph.

In describing the self balancing features it is self evident that if the five crank shaft as shown is uniform in weight throughout its several parts that at all points during the rotation of the shaft the weight is equally distributed to both sides of the longitudinal axis. Referring to Fig. 2 it is seen that the center line of A is in the top or vertical plane and that one half of the weight of A tends to rotate the shaft to the right and the other half toward the left. Also C is 72 degrees to the right of A or the vertical plane and E is 72 degrees to the left, with the result that the force of the weight of one is equal and opposite to the force of the other. The same is true of B and D and the shaft is therefore in equilibrium. By the calculation of the forces it will be seen that this is true for any other positions of the cranks during the process of rotation.

To effect the balance of the motive processes it will be shown that a much more perfect balance can be obtained with a five crank, five cylinder, four cycle internal combustion engine than with other types for the reason that the explosions occur successively at 144 degree intervals. By this method continuous power is applied on the downward cranks, the explosion occurring in one cylinder a small fraction of a revolution before the preceding exploded cylinder begins to exhaust.

Referring again to Fig. 2 assume that the cylinder for the crank A is at the point of explosion then the order of the motive processes in the other cylinders is as follows; C is on the intake stroke, D is nearly at the bottom of the power stroke just prior to the beginning of the upward exhaust stroke, B is on the compression stroke, and E is on the exhaust stroke.

It is seen that soon after the full impulse of the explosion is felt in the cylinder A the power is released from the cylinder C through the exhaust. This slight lapping power impulses provides for the application of continuous power in the motor and eliminates the faults of slight intervals in which no power is applied. Also, slightly after the explosion in the cylinder A the cylinder C begins to exhaust and thereafter the power impulse on the downward stroke of A is controlled or counter balanced by the opposing motive operations of the other four cylinders in exhausting, compressing and intaking.

I claim:

1. A self balancing five crank shaft, the successive crank bearings of which are at the following angles, A 216 degrees from B, B 216 degrees from C, C 72 degrees from D, D 144 degrees from E, all substantially as shown, and in the direction of rotation.

2. A self balancing five crank shaft, the successive crank bearings of which are at the following angles, A 144 degrees from B, B 144 degrees from C, C 288 degrees from D, and D 216 degrees from E, in the direction of rotation and all substantially as shown.

CHRIS G. BARR.